Aug. 7, 1951     A. H. EVANS     2,563,324

RODENT TRAP ATTACHMENT

Filed Nov. 4, 1949

A. H. Evans

INVENTOR

BY *C. A. Snow & Co.*

ATTORNEYS.

Patented Aug. 7, 1951

2,563,324

UNITED STATES PATENT OFFICE 2,563,324

RODENT TRAP ATTACHMENT

Ambrose H. Evans, Hutchinson, Kans.

Application November 4, 1949, Serial No. 125,534

1 Claim. (Cl. 43—83.5)

This invention relates to an attachment designed for use on spring jaw traps for catching rodents, preferably mice and rats.

An important object of the invention is to provide means whereby the jaw after it has been actuated to trap a rodent, may be readily moved to release the rodent and clear the trap for further baiting.

Another object of the invention is to provide a device of this character which may be operated from the latch end of the trap while the trap is being held in one hand, thereby eliminating any possibility of the spring jaw injuring the hands of the operator of the trap.

A still further object of the invention is to provide a device of this character which will not only elevate the jaw from the rodent caught thereby, but will secure the jaw in its elevated position against accidental movement during the removal of the rodent from the trap.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 1:
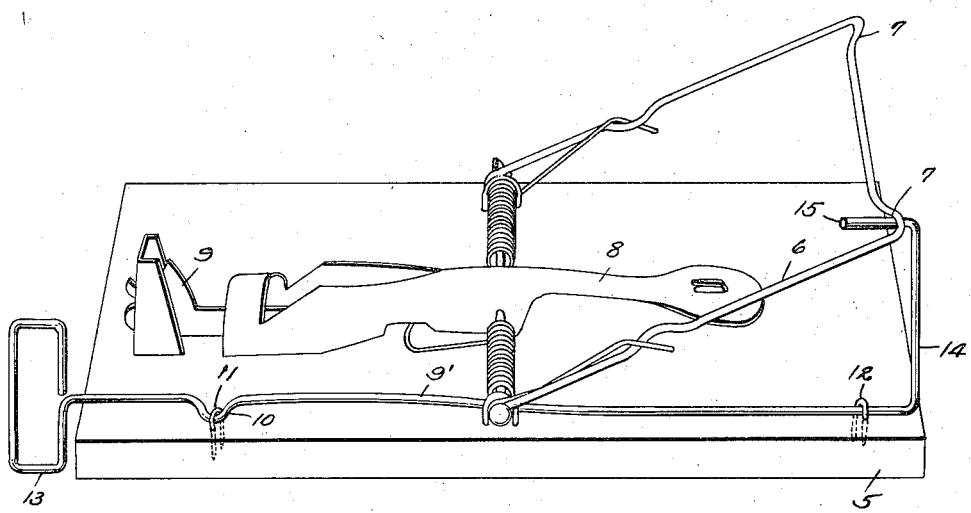
Figure 1 is a perspective view of a spring jaw trap equipped with a jaw actuating arm, constructed in accordance with the invention.

Referring to the drawing in detail, the reference character 5 indicates the base of the trap to which the usual spring jaw 6 is secured, the jaw 6 having offsets 7 providing keepers for the reception of the end of the releasing arm, forming the subject matter of the present invention.

The reference character 8 indicates the conventional bait retaining arm which is held in its set position, by means of the latch mechanism 9.

The arm forming the essence of the present invention, is indicated generally by the reference character 9' and as shown, is provided with an offset portion 10 to which the staple 11 is secured, the staple 11 passing into the base 5, as clearly shown by Fig. 1 of the drawing. This offset portion 10 provides a surface which will act as a means to prevent turning of the arm 9', under normal conditions.

A staple indicated by the reference character 12 is positioned over the arm adjacent to the opposite end thereof, and completes the pivot for the arm.

Figure 2:
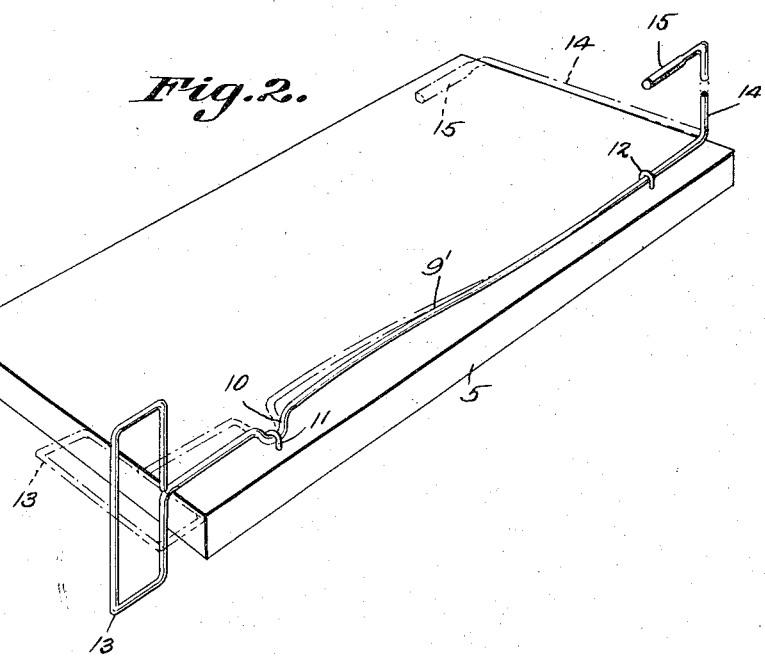
Fig. 2 is a perspective view of the trap base with the jaw mechanism thereof removed, the jaw releasing arm being shown in its normal inactive position, in dotted lines.

The arm 9' is of a length so that the end or handle 13, by means of which the arm is rotated, extends beyond one end of the base of the trap, where it may be readily moved from the full line position, shown by Fig. 2 of the drawing, to the dotted line position where it will lie flat with the upper surface of the base of the trap and will not obstruct movements of a rodent around the trap in an effort to remove the bait.

The opposite end of the arm 9' is extended at right angles as at 14, the extremity thereof being extended rearwardly as at 15, where it is disposed in parallel spaced relation with the main portion of the arm.

This end 15, when in its normal inactive position, lies flat on the upper surface of the base, as indicated in dotted lines in Fig. 2 of the drawing. However, when it is desired to elevate the jaw 6 of the trap to release the rodent caught therein, it is only necessary to rotate the handle 13 to swing the right angled end 14 upwardly as shown by the drawing, the rearwardly extended extremity 15 thereof moving into the offset portion 7, where the rearwardly extended end 15 is held against accidental displacement or movement, while the rodent is being removed, thereby permitting the operator to hold the trap by the base and strike the trap against a stationary object, should it be necessary to remove the rodent from the trap in this way.

From the foregoing it will be seen that due to the construction shown and described, I have provided a means whereby the jaw of a spring rodent trap, may be moved vertically to disengage the rodent caught thereunder, thereby permitting the rodent to be removed by merely reversing the trap over a receptacle or container into which the rodent will be deposited, with the jaw in the elevated position, whereupon the rodent will fall from the trap.

Having thus described the invention, what is claimed is:

The combination with a trap including a base and a spring jaw, the jaw having an offset portion, of a rodent releasing means embodying an arm pivotally connected to the upper surface of the base, one end of the arm being extended at right angles, the extremity of the right angled end extending rearwardly under the jaw, a handle by means of which the arm is rotated elevating the jaw, and said extremity of the right angled end of the arm moving into the offset portion, holding the arm against movement.

AMBROSE H. EVANS.

REFERENCES CITED

The following references are of record in the file of this patent:

UNITED STATES PATENTS

| Number | Name | Date |
|---|---|---|
| 1,995,344 | Gebhard | Mar. 26, 1935 |
| 1,997,932 | Houts | Apr. 16, 1935 |